United States Patent
Zheng et al.

(10) Patent No.: US 12,125,503 B2
(45) Date of Patent: Oct. 22, 2024

(54) METHOD, APPARATUS, ELECTRONIC DEVICE, AND READABLE STORAGE MEDIUM FOR VIDEO EDITING

(71) Applicant: Beijing Zitiao Network Technology Co., Ltd., Beijing (CN)

(72) Inventors: Haowen Zheng, Beijing (CN); Xiangrui Zeng, Beijing (CN); Fan Wu, Beijing (CN); Qizhi Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/399,186

(22) Filed: Dec. 28, 2023

(65) Prior Publication Data
US 2024/0212718 A1    Jun. 27, 2024

Related U.S. Application Data

(63) Continuation of application No. PCT/CN2023/138943, filed on Dec. 14, 2023.

(30) Foreign Application Priority Data

Dec. 21, 2022   (CN) .......................... 202211652470.7

(51) Int. Cl.
*G11B 27/10*    (2006.01)
*G11B 27/00*    (2006.01)
*G11B 27/036*   (2006.01)
*H04N 1/21*     (2006.01)
*H04N 21/00*    (2011.01)

(52) U.S. Cl.
CPC .................................. *G11B 27/036* (2013.01)

(58) Field of Classification Search
CPC .......... G11B 27/10; G11B 27/00; H04N 1/21; H04N 21/00
USPC .......................... 386/278, 282, 239, 248, 241
See application file for complete search history.

(56) References Cited

U.S. PATENT DOCUMENTS

| | | | |
|---|---|---|---|
| 11,430,484 B1 * | 8/2022 | Fortunato | G11B 27/031 |
| 2012/0210231 A1 * | 8/2012 | Ubillos | G11B 27/034 |
| | | | 715/723 |

* cited by examiner

*Primary Examiner* — Daquan Zhao
(74) *Attorney, Agent, or Firm* — BakerHostetler

(57) ABSTRACT

The present application relates to a method, an apparatus, an electronic device, and a readable storage medium for video editing. The method comprises: obtaining a video editing template, importing corresponding target video material into one or more specified video segments indicated by the video editing template; in response to a triggering operation for forming a composite segment, combining the target video material imported on the one or more specified video segments with a specified editing operation indicated by the video editing template to form a target composite segment, and adding the target composite segment on a first video editing track. By combining the composite segment function with the video editing template, the user can edit the composite segment as a whole, improving the processing efficiency of the user using the video editing template for video editing.

17 Claims, 13 Drawing Sheets

METHOD, APPARATUS, ELECTRONIC DEVICE, AND READABLE STORAGE MEDIUM FOR VIDEO EDITING

CROSS-REFERENCE TO RELATED APPLICATIONS

This application is a continuation of International Patent Application No. PCT/CN2023/138943, filed on Dec. 14, 2023, which claims priority to Chinese Application No. 202211652470.7 filed Dec. 21, 2022, the title is "Method, apparatus, electronic device, and readable storage medium for video editing," the disclosures of which are incorporated herein by reference in their entireties.

FIELD

The present application relates to the technical field of video processing technology, and particularly relates to a method, an apparatus, an electronic device, and a readable storage medium for video editing.

BACKGROUND

With the rapid development of internet technology, more and more users prefer to record life in the form of video, often to edit multiple video material into a visually rich video.

In order to facilitate the user's editing and reduce the requirement for the user's skills to edit the video, some video editing applications provide the user with a video editing template. By importing video materials, they want to edit, the user may use the editing operations indicated by the video editing template to integrate the video materials into a complete video. However, when video editing is performed using the video editing application program, and after the required video material is imported into a video editing track indicated by the video editing template, a template editing page will be entered. In the template editing page, the user may adjust the video material on each video editing track or apply a new editing operation, showing low editing efficiency. Therefore, how to further improve the efficiency of the user performing video editing using the video editing template is an urgent problem to be currently solved.

SUMMARY

In order to solve the above technical problems, the present disclosure provides a method, an apparatus, an electronic device, and a readable storage medium for video editing.

In a first aspect, the present disclosure provides a method for video editing, comprising:
  obtaining a video editing template, the video editing template being used for indicating to add a specified editing operation to one or more specified video segments; wherein a composite segment corresponding to a set of editing tracks can be obtained via a combination of editing track segments of the one or more specified video segments and editing track segments of the added specified editing operation;
  in response to a triggering operation for importing video material, importing corresponding target video material into one or more specified video segments indicated by the video editing template;
  in response to a triggering operation for forming a composite segment, combining the target video material imported on the one or more specified video segments with a specified editing operation indicated by the video editing template to form a target composite segment, and adding the target composite segment on a first video editing track.

In some embodiments, in response to a triggering operation for importing video material, importing corresponding target video material into one or more specified video segments indicated by the video editing template comprises:
  displaying segment identifiers corresponding to the one or more video segments on a one-to-one basis;
  in response to a triggering operation for the segment identifier, adding target video material to a specified video segment corresponding to the segment identifier.

In some embodiments, the displaying a segment identifier corresponding to the one or more specified video segments on a one-to-one basis comprises:
  displaying a composite segment corresponding to the video editing template, the composite segment being added on the first video editing track;
  in response to a triggering operation for the composite segment, presenting a segment identifier corresponding to the one or more specified video segments on a one-to-one basis.

In some embodiments, the method further comprises:
  editing the target video material imported on the specified video segment, emptying the target video material imported on the specified video segment, or replacing target video material imported on the specified video segment.

In some embodiments, the method further comprises:
  in response to a triggering operation for unlocking the target composite segment combination, displaying each specified video segment for forming the target composite segment and a video editing track respectively corresponding to a specified editing operation.

In some embodiments, the method further comprises:
  editing a text content corresponding to a text editing operation indicated by the video editing template.

In some embodiments, the method further comprises:
  replacing audio material used by the video editing template.

In some embodiments, the method further comprises:
  in response to a triggering operation for compositing the target composite segment, performing video compositing on target video material on each editing track segment contained in the target composite segment and an added specified editing operation to obtain a composite video.

In a second aspect, the present disclosure provides an apparatus for video editing, comprising:
  an obtaining module for obtaining a video editing template, the video editing template being used for indicating to add a specified editing operation to one or more specified video segments; wherein a composite segment corresponding to a set of editing tracks can be obtained via a combination of editing track segments of the one or more specified video segments and editing track segments of the added specified editing operation;
  a processing module for, in response to a triggering operation for importing video material, importing corresponding target video material into one or more specified video segments indicated by the video editing template;
  in response to a triggering operation for forming a composite segment, combining the target video material imported on the one or more specified video segments with a specified editing operation indicated by the video editing template to form a target composite segment, and adding the target composite segment on a first video editing track.

In a third aspect, the present disclosure provides an electronic device comprising: a memory and a processor;

the memory is configured to store computer program instructions;

the processor is configured to execute the computer program instructions to cause the electronic device to perform the method for video editing of any of claims 1 to 8.

In a fourth aspect, the present disclosure provides a readable storage medium comprising: computer program instructions; at least one processor of an electronic device executing the computer program instructions to cause the electronic device to perform the method for video editing of the first aspect or any item of the first aspect.

In a fifth aspect, the present disclosure provides a computer program product, an electronic device running the computer program product such that the electronic device performs the method for video editing as claimed in the first aspect or any item of the first aspect.

The present application relates to a method, an apparatus, an electronic device, and a readable storage medium for video editing. The method comprises: obtaining a video editing template, importing target video material into one or more specified video segments indicated by the video editing template; in response to a triggering operation for forming a composite segment, combining the target video material imported on the one or more specified video segments with a specified editing operation indicated by the video editing template to form a target composite segment, and adding the target composite segment on a first video editing track. By combining the composite segment function with the video editing template, the user can edit the composite segment as a whole, improving the processing efficiency of the user using the video editing template to edit video.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

In order to explain the embodiments of the present disclosure or the technical solutions in the prior art more clearly, the following simple description will be given to the accompanying drawings which are used in the embodiments or the description of the prior art; it would be obvious for a person skilled in the art to obtain other drawings according to these drawings without involving any inventive effort.

DETAILED DESCRIPTION OF EMBODIMENTS

In order that the foregoing objects, features and advantages of the present disclosure may be more clearly understood, a more particular description of the embodiments of the present disclosure will be rendered. It should be noted that embodiments and features of embodiments of the present disclosure may be combined with each other without conflict.

In the following description, numerous specific details are set forth in order to provide a thorough understanding of the present disclosure, but the present disclosure may be practiced otherwise than as specifically described herein. It should be understood that the embodiments in the description are only a part of the embodiments of the disclosure, not all of them.

Illustratively, the method for video editing provided by the present disclosure may be implemented by the apparatus for video editing, which may be implemented in software and/or hardware, and may be generally integrated in the electronic device. The electronic device may be, but is not limited to: tablet computers, wearable devices, augmented reality (AR)/virtual reality (VR) devices, notebook computers, desktop computers, ultra-mobile personal computer (UMPC), netbooks, personal digital assistant (PDA) and other electronic devices, and the specific types of electronic devices are not limited in this disclosure.

In the following embodiments, the electronic device is taken as an example, and a method for video editing provided in the present disclosure is described in detail with reference to the drawings and application scenarios.

Figure 1:
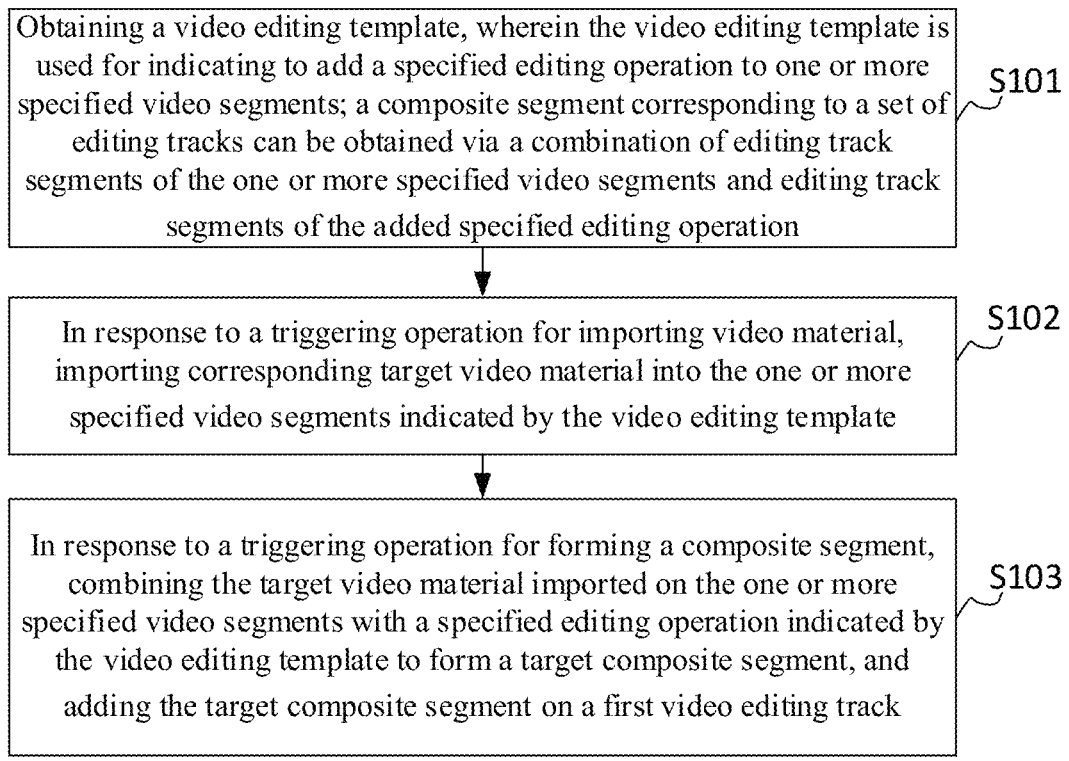
FIG. 1 illustrates a flow diagram of a method for video editing in accordance with an embodiment of the present disclosure.

FIG. 1 illustrates a flow diagram of a method for video editing in accordance with an embodiment of the present disclosure. Referring to FIG. 1, the method of the present embodiment comprises:

S101, obtaining a video editing template, wherein the video editing template is used for indicating to add a specified editing operation to one or more specified video segments; a composite segment corresponding to a set of editing tracks can be obtained via a combination of editing track segments of the one or more specified video segments and editing track segments of the added specified editing operation;

The composite segment is a segment corresponding to the set of editing tracks formed by combining editing track segments corresponding to one or more video segments and the editing track segments corresponding to a specified editing operation, and the positions of the editing track segments corresponding to each specified video segment used for forming the composite segment and the editing track segments the specified editing operation on the time line maintain a certain relative relationship. It can also be understood that the video material subsequently imported to each specified video segment and the specified editing operation indicated by the video editing template respectively maintain a relative relationship between the position intervals covered on the time line. By forming the composite segment, the material on each editing track segment in the set of editing track segments can be manipulated as a whole, which is extremely convenient for the user. In addition, the video editing template may comprise indication information indicating which of the specified video segments and the video editing operations applied to the specified video segments are used to form the composite segment.

The video editing application program (hereinafter referred to as an application) can be installed in the electronic device. The application program is started, and the user can browse template videos obtained by editing using different video editing templates. The template videos mentioned herein are videos created by an author using the video editing template and published in the application program. A usage entry of the video editing template can be comprised in a play page of the template videos, and the user inputs a triggering operation for the usage entry to trigger the use of the video editing template to perform a video editing, wherein the triggering for the usage entry can be, but is not limited to, a single click, double click, long press, slide, etc., type of operation.

The application program, in response to the triggering operation for the usage entry for the video editing template, obtains the video editing template, either from the local cache of the electronic device or from the service end. In addition, the video editing template may comprise: information specifying the number, order, duration, etc. of video segments, information specifying the editing operation, information specifying video material on which video editing operation is applied, etc. The specified video segments can be understood to be video editing track segments without added video material indicated by a video editing template, and the number of the specified video segments can be one or more. This is not limited in the present disclosure. The specified editing operation may comprise, but are not limited to, one or more of special effect operations, filter operations, music operations, text operations, music editing operations, and the like.

S102, in response to a triggering operation for importing the video material, importing corresponding target video material into one or more specified video segments indicated by the video editing template.

In some embodiments, when the user triggers the use of the video editing template, the application may display a segment identifier corresponding to each specified video segment indicated by the video editing template on a one-to-one basis, and the user imports video material into the specified video segment by manipulating the segment identifier. The segment identifier can be realized by any method, for example, by one or more ways of text, icons, pictures, etc. and the present disclosure is not limited thereto.

The user can drag a file from a local folder/media library to a position corresponding to a segment identifier so as to add a selected file to the video segment corresponding to the segment identifier, wherein the position of the local folder needs to be located on the application program; or, a local file filter can also be called to add a file to a video segment by operating a segment identifier; alternatively, the video material can also be added to the video segment corresponding to the segment identifier via a material library provided by an application program, and the material library can be a local material library or a cloud material library.

In another embodiments, when the user triggers the use of a video editing template, an application program may display a composite segment corresponding to the video editing template, and the user triggers the application program by operating the composite segment on the video editing track to display a segment identifier corresponding to each specified video segment indicated by the video editing template, and then the user imports video material into the specified video segment by operating the segment identifier. The editing track segments corresponding to each specified video segment in the set of editing track segments corresponding to the composite segment corresponding to the video editing template may not have any video material added thereto, or may have pre-set video material added thereto, and the pre-set video material may be any material, for example, video material generated by the cover of the video editing template.

The editing track segment identifier respectively corresponding to one or more specified video segments can be contained in the position interval covered by a composite segment on the first video editing track, and the importing of the target video material into the corresponding specified video segment is triggered by operating the editing track segment identifier of the certain specified video segment. The editing track segment identifiers corresponding to each editing track segment in the set of editing track segments on a one-to-one basis are display according to their respective precedence positions on the time line, and if overlapping, editing track segment identifiers corresponding to editing track segments with a higher level are displayed. Of course, editing track segment identifiers corresponding to partial editing track segments may also be displayed on the first video editing track, for example, editing track segment identifiers of editing track segments to which video material needs to be imported are displayed, and editing track segment identifiers corresponding to editing track segments to which a specified editing operation corresponds are hidden.

The application program may, in response to the triggering operation for the editing track segment identifier on the first video editing track, present the segment identifier corresponding to each specified video segment forming the composite segment on a one-to-one basis and locate the specified video segment selected by the user.

Indication information may be comprised in the video editing template to indicate which of the specified video segments and the video editing operations applied to the specified video segments are used to form the composite segment. After the video editing template is obtained, the application program determines, based on the indication information, each specified video segment for forming the composite segment corresponding to the video editing template and a specified editing operation applied on the specified video segment, and combines these specified video segments and the specified editing operation synchronously to obtain the composite segment.

The first video editing track is a video editing track corresponding to the composite segment, namely, a video editing track of one or more specified video editing tracks indicated by the video editing template and the applied editing operation in a synchronous combination state; and when the composite segment is unassembled, the one or more specified video segments indicated by the video editing template and the applied specified editing operation respectively correspond to respective second video editing tracks.

In addition, other video segments indicated by the video editing template may be added to the first video editing track. For example, the video editing that user does not have the right to edit. Of course, the first video editing track may only include a composite segment and the present disclosure is not limited thereto.

S103, in response to the triggering operation to form the composite segment, combining the target video material imported on the one or more specified video segments with the specified editing operation indicated by the video editing template to form the target composite segment, and adding the target composite segment on the first video editing track.

In some embodiments, the user may trigger the formation of the target composite segment by operating an associated control on a page provided by the application. The application, in response to the triggering operation, combines the target video material imported by the user and the specified editing operation indicated by the video editing template to form the target composite segment.

In other embodiments, the target video material imported by the user, the pre-set video material not replaced and included in the composite segment corresponding to the video editing template, and the specified editing operation indicated by the video editing template may also be combined to obtain the target composite segment.

It should be noted that, when for combination, the relative relationship of the editing track segments corresponding to each specified video segment and the editing track segments corresponding to the specified editing operation on the timeline remains unchanged. The composite segment corresponding to a video editing template differs from the target composite segment in that some or all of the video material on a specified video segment change.

By adding the target composite segment to the first video editing track, the user can edit the target composite segment on the first video editing track entirety.

In the method of the present embodiment, by combining a composite segment function with the video editing template, when the user imports target video material into the specified video editing indicated by the video editing template and the composite segment is formed to be added on the corresponding video editing track, the user can perform the editing operation on the composite segment as a whole, and using the composite segment can simplify a complex editing item, thereby improving the processing efficiency of the user performing video editing using the video editing template. In addition, the number of video material and video editing operations forming a composite segment is usually multiple, and the number of video editing tracks corresponding to the composite segment is far less than the total number of video editing tracks respectively corresponding to the video material and video editing operations for forming the composite segment. It can be seen therefrom that using the composite segment can also simplify elements displayed by the template editing page and improve the visual effect.

On the basis of the embodiment of FIG. 1, it may further comprise: the user may input a trigger that triggers the composition of the composite segment, and the application performs video composition on the video material contained in the target composite segment and the added specified editing operation to obtain the composite video in response to the trigger operation of the target composite segment.

Figure 2:
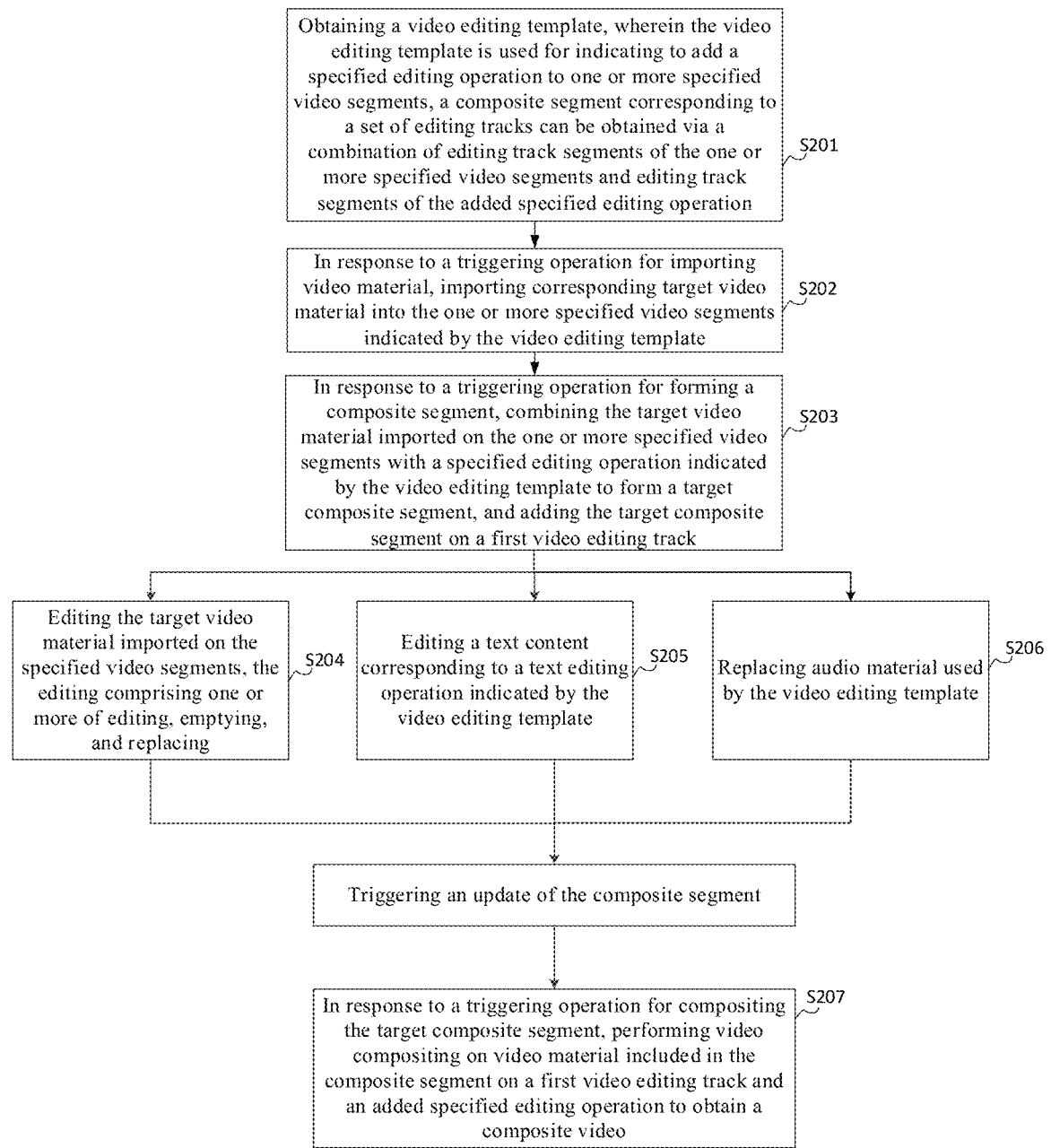
FIG. 2 illustrates a flow diagram of a method for video editing in accordance with another embodiment of the present disclosure.

FIG. 2 illustrates a flow diagram of a method for video editing in accordance to another embodiment of the present disclosure. Referring to FIG. 2, the method of the present embodiment comprises:

S201, obtaining the video editing template, wherein the video editing template is used for indicating to add the specified editing operation to one or more specified video segments; the composite segment corresponding to the set of editing tracks can be obtained via the combination of editing track segments of the one or more specified video segments and editing track segments of the added specified editing operation;

S202, in response to the triggering operation importing video material, importing corresponding target video material into one or more specified video segments indicated by the video editing template;

S203, in response to the triggering operation for forming the composite segment, combining the target video material imported on the one or more specified video segments with the specified editing operation indicated by the video editing template to form the target composite segment, and adding the target composite segment on the first video editing track Steps S201 to S203 of the present embodiment are similar to steps S101 to S103 of the embodiment shown in FIG. 1, respectively, and reference may be made to the foregoing detailed description of the embodiment shown in FIG. 1, and this will not be repeated here.

To meet the user's diverse video editing requirements, the application also supports the user to re-edit the imported target video material, supports the user to modify the text editing operations indicated by the video editing template, supports the user to modify music editing operations indicated by the video editing template, etc. Illustratively, after step S203, one or more of steps S204 through S206 may also be performed.

S204, editing the target video material imported on the specified video editing, the editing comprising one or more of editing, emptying, and replacing.

The application program displays the segment identifier corresponding to each specified video segment used for forming the first composite segment in the relevant user interface, wherein the video segment into which the target video material is imported and the video segment into which the target video material is not imported can respectively correspond to different video segment identifier styles so as to facilitate the user to distinguish, and the user can trigger to enter a material editing page by triggering a segment identifier corresponding to the video segment into which the target video material is imported and edit the target video material using an editing component provided in the material editing page, etc.

S205, editing the text content corresponding to the text editing operation indicated by the video editing template.

In some embodiments, the application program may provide a preview play area in which the user modifies text content corresponding to the text editing operation.

In some embodiments, the application program may also aggregately show all text editing operations indicated by the video editing in the relevant area, such as displaying in order of addition precedence, each text editing operation corresponding to a text box, and the user may modify the text content in the text box.

S206, replacing the audio material used by the video editing template S206.

The application program may also aggregately show all audio addition operations indicated by the video editing template in the relevant user interface area, such as displaying the added one or more audio material in order of precedence of addition, the user deleting the audio material indicated by the video editing template, and importing target audio material that meets the user's expectations. The target audio material may be applied to the entire composite segment, and may automatically cycle when the target audio material is not long enough.

The user may perform any one or more of the above-mentioned steps S204 to S206 to adjust the second composite segment, and may repeatedly perform a plurality of times until the desired effect is achieved to trigger update of the composite segment on the first video editing track again.

Note that step S205 and step S206 may be performed before step S202 or step S203.

Based on the embodiment of FIG. 2, it may further comprise:

S207, in response to the triggering operation for compositing the composite segment, performing video compositing on the video material contained in the composite segment on the first video editing track and the added specified editing operation to obtain the composite video.

The user can input a composition instruction to the application by operating the control provided by the application to trigger the composite video, and the application performs video composition on the video material contained in the composite segment on the first video editing track and the added specified editing operation to obtain the composite video in response to the composition instruction.

Figure 3:
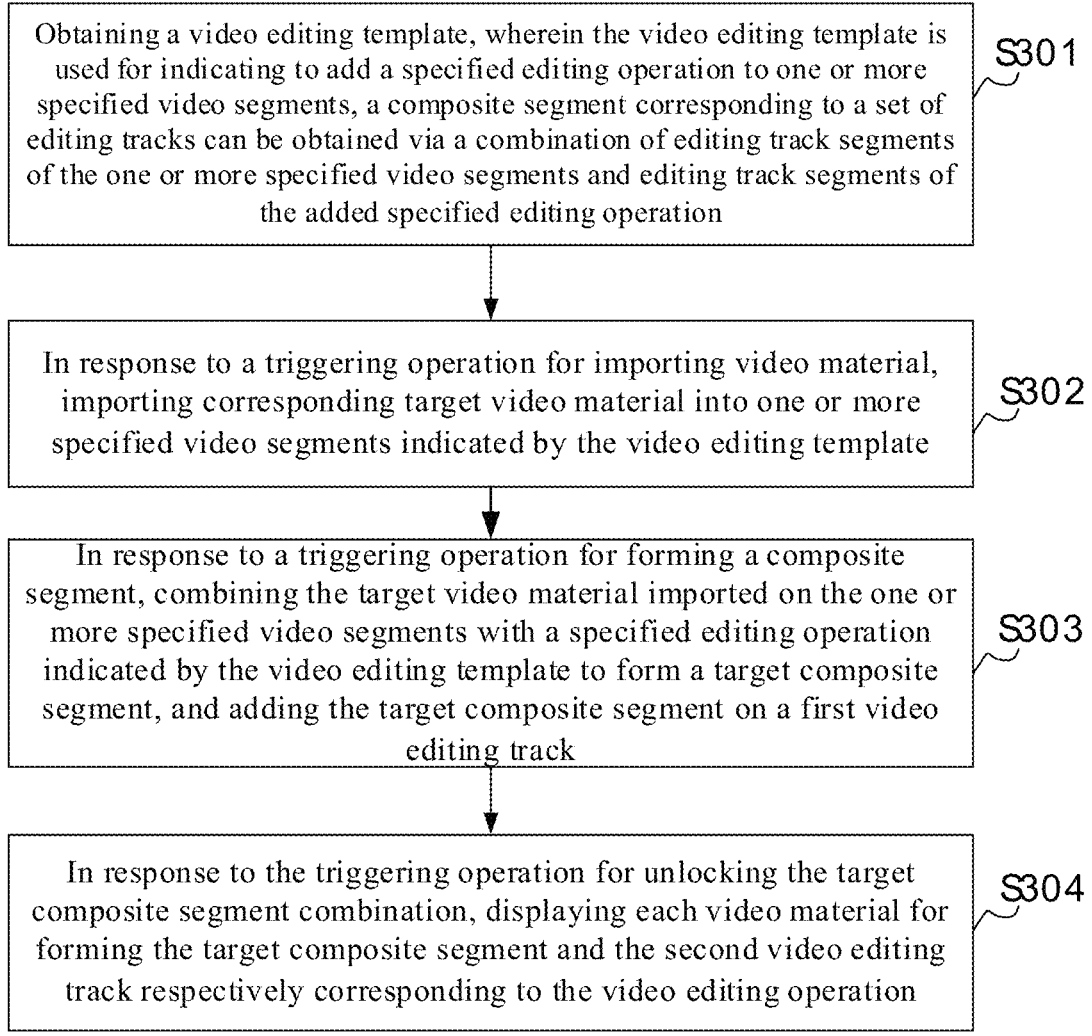
FIG. 3 illustrates a flow diagram of a method for video editing in accordance with another embodiment of the present disclosure.

FIG. 3 illustrates a flow diagram of a method for video editing in accordance to another embodiment of the present disclosure. Referring to FIG. 3, the method of the present embodiment comprises:

S301, obtaining a video editing template, wherein the video editing template is used for indicating to add the specified editing operation to one or more specified video segments; the composite segment corresponding to the set of editing tracks can be obtained via a combination of editing track segments of the one or more specified video segments and editing track segments of the added specified editing operation.

S302, in response to the triggering operation for importing video material, importing corresponding target video material into one or more specified video segments indicated by the video editing template.

S303, in response to the triggering operation for forming the composite segment, the target video material imported on the one or more specified video segments is combined with the specified editing operation indicated by the video editing template to form the target composite segment, and the target composite segment is added on the first video editing track.

Steps S301 to S303 of the present embodiment are similar to steps S101 to S103 of the embodiment shown in FIG. 1, respectively, and reference may be made to the foregoing detailed description of the embodiment shown in FIG. 1, which will not be repeated here.

S304, in response to the triggering operation for unlocking the target composite segment combination, displaying each specified video segment for forming the target composite segment and the second video editing track respectively corresponding to the specified editing operation.

Unlocking the target composite segment sync composition can be understood as canceling the relative relationship of the video materials forming the target composite segment and the specified editing operation on the timeline. After unlocking the composite segment, the application program can show each video material and the second video editing track corresponding to each specified editing operation on a one-to-one basis, and the specified video segment corresponding to the video material is an editing track segment on the second video editing track, and the specified editing operation covers a corresponding range on the second video editing track. Therefore, it can facilitate the user to adjust a single video material or a single specified editing operation, for example, deleting a certain video material, deleting a certain specified editing operation, adjusting a coverage range of the specified editing operation on a time line, etc. so as to satisfy the user's requirement of adjusting a video editing template and improve flexibility of video segments.

In some cases, the user may redeem the right to unlock the composite fragment through the held virtual resource, and after unlocking the right, perform the above-mentioned unlocking triggering operation. It should be understood that the rights may also be obtained in other ways, and the present disclosure is not limited thereto.

Thereafter, the user can adjust the video material on the second video editing track or the single specified editing operation and trigger the composite video.

Based on the foregoing description, a method for video editing provided by the present disclosure will be described in detail in conjunction with the interactive interface diagrams illustrated in FIGS. 4A through 4I. For convenience of explanation, in FIGS. 4A to 4I, the electronic device is a notebook computer, a video editing tool (hereinafter referred to simply as an application 1) is installed in the notebook computer. The video editing is performed through the video editing template provided by the application 1, which is used as an example for illustrating.

Reference is now made to FIGS. 4A-4I, FIGS. 4A-4I illustrate schematic diagrams of interaction interfaces in accordance to the present disclosure.

Wherein the application 1 can provide an entry to enter a template video aggregation page in different pages; browse the template video through the template video aggregation page to select a video editing template of which the editing effect meets the expectation; the usage entry of the video editing template can be set in a window for playing the template video; and the user can trigger to use the video editing template by operating the usage entrance.

Illustratively, the template video aggregation page may be entered through the entry in the launcher, or alternatively, an editing page may be entered through the launcher and the template video syndication page may be entered through an entry in the editing page.

Figure 4A:
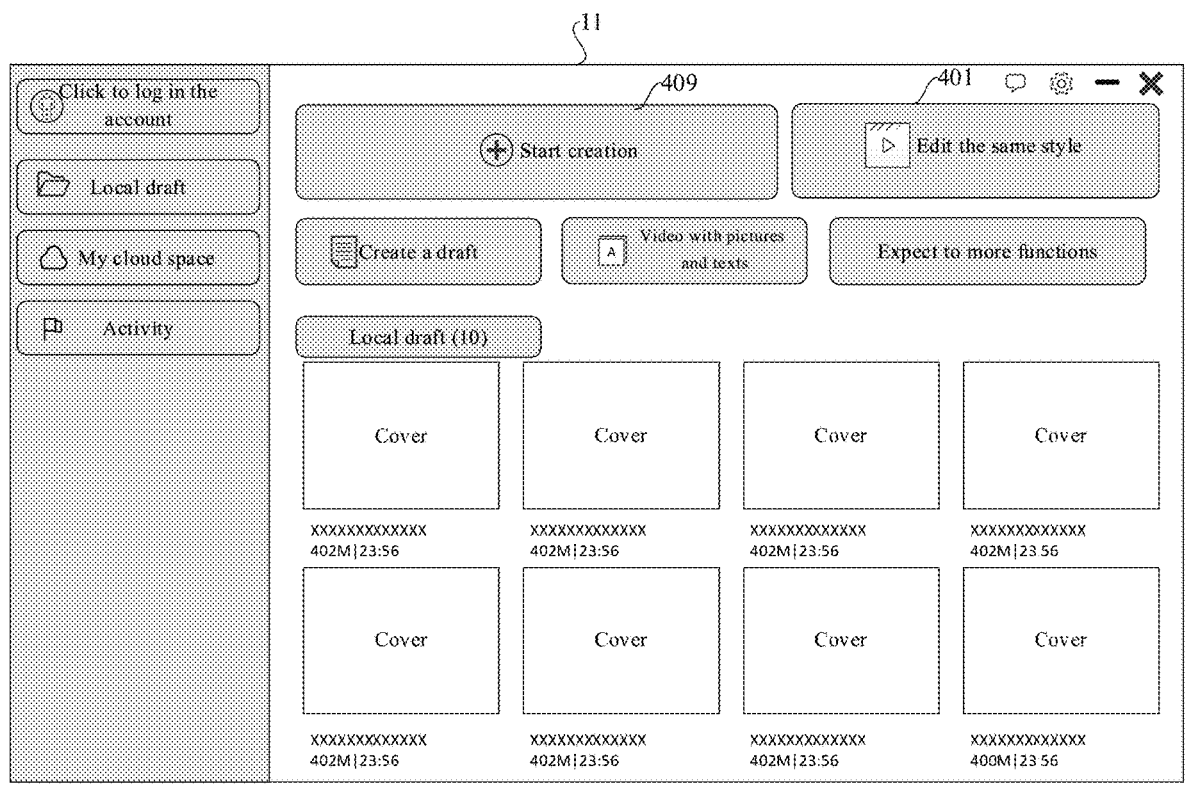
FIGS. 4A-4I illustrate schematic diagrams of interaction interfaces in accordance with the present disclosure.
Figure 4B:
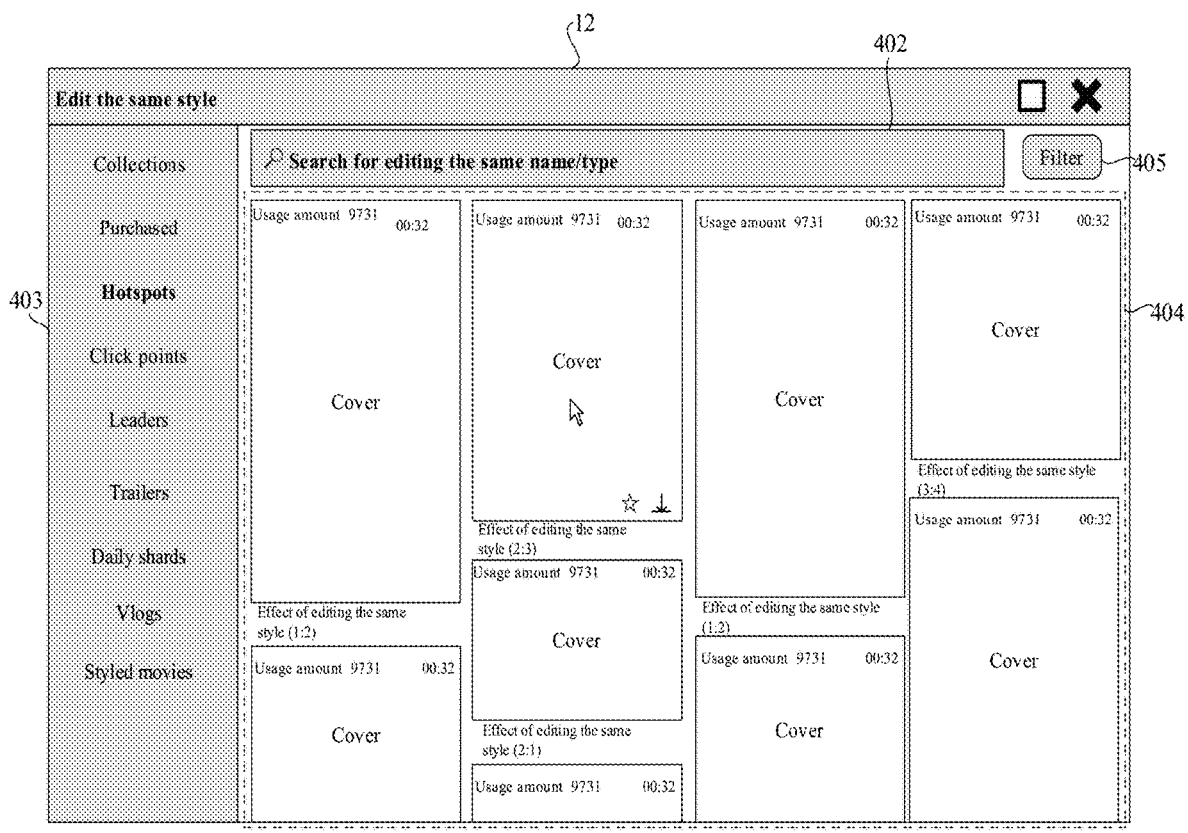

Therein, when an application 1 is started, a launcher is first entered, and a user interface 11 as shown in FIG. 4A is presented on the electronic device, the user interface 11 being used for presenting the launcher. The user interface 11 comprises a control 401 for entering the template video aggregation page. The application 1, in response to the user triggering operation (such as a click operation) on the control 401, may present a user interface 12 as shown in FIG. 4B on the electronic device. The user interface 12 may comprise a window for the template video aggregation page (namely, a feed stream page). A search box 402 may be presented at the top of the page; a left area 403 presents a list bar; and a right area 404 is a feed stream, namely, an information stream of a template video which is continuously updated and presented to a user.

The window size of the template video aggregation page can be, but is not limited to, 1055*704, and the window can be switched to a full screen state, can be scaled by means of dragging, and can also support moving positions. FIG. 4B illustrates the full screen state.

With regard to the search box 402 presented in the window, the search box 402 may reside in the top position of the window, and may present a default text content "search for editing the same name/type"; clicking the search box 402 to input text. When the search box is clicked, the default text content is no longer presented. In order to facilitate the user being able to quickly find a desired video editing template, a recommended word may also be presented to the user in the process of the user inputting the text content, wherein the recommended word may be a name of a video editing template with a relatively high usage amount, etc. The user can select a recommended word by mouse movement or select a recommended word by operating up and down keys on an external keyboard of the electronic device, and by clicking a mouse or operating a confirmation key on the keyboard, the application 1 will present a search result obtained by searching based on the recommended word selected by the user. When the search result is presented, there is no selected state in the left area 403, and if a certain option in the left area 403 is re-selected, it can be relocated to the position where is lastly recorded by the application 1.

Classification tags for the video editing templates may be presented in the left area 403 and may comprise, for example, one or more template classification tags for favorites, purchased, recommendations, hotspots, unlocks, click points, leaders, trailers, daily shards, styled movies, vlogs, etc. The user can view different types of video editing templates by switching classification options.

The right area 404 is a feed stream, and can be a horizontal screen template by default. In addition, if a classification is slid to a certain position, a classification label or a module label is switched back to the classification label, and at this time, if the feed page is not recycled, the feed page is still located at the last browsing position; if the feed page has been reclaimed, there is no need to return to the last viewed position. The cover of the template video can be presented in the area 404, and the cover can be scaled according to the cover proportion of the original template video to ensure that the cover is completely presented; the name of the video editing template or other information (such as an editing effect) can be presented below the cover. In order to reduce the area occupied by the name of the video editing template, a line can be presented, and the part beyond the line which cannot be presented can be represented by an ellipsis. In addition, information such as the usage amount of the video editing template, the duration of the template video, etc. may also be presented. When a mouse is suspended at the cover of a certain template video, a favorite button can be presented to facilitate the user to collect the corresponding video editing template. A download button may also be presented to facilitate the user in downloading the corresponding video editing template.

The area 404 also comprises a control 405 for triggering selecting of the video editing template, and the user can select conditions by setting selecting conditions, e.g., number of video segments, template duration, etc.

It should be noted that when a certain classification label is entered for the first time, the application 1 can load the feed content corresponding to the classification label; if the process ends unexpectedly in the loading process, when entering the classification label, reloading the feed content corresponding to the classification label. It is also possible to click refresh manually, for example, click refresh on a page under a single category label, it is possible to refresh the contents of the current list, and if the loading fails, it is possible to present a prompt message, for example, the prompt "abnormal network, try again". Alternatively, the feed content can also be loaded in batches, each time a preset number of pieces of feed content are loaded, the next batch of feed content can be loaded in the process of user browsing, the loading style can be presented at the bottom of the page, and if the loading fails, a prompt message "more loaded" can be presented at the bottom, and clicking on the prompt or continuing to pull down once to trigger reloading. In some cases, it may not be possible to load more content, and the presentation content "no more content" may be presented at the bottom. In some cases, it may happen that the feed content is not loaded successfully for more than a pre-set time, the prompt message "Load timeout, try again" may be presented. In some cases, there may be a situation where there is no feed content under a certain classification label; if application 1 cannot be loaded into the feed content, prompt information "no content temporarily, click to retry" may be presented; click may pull the classification list again; and the user may select other classification labels to view the video editing template.

Figure 4C:
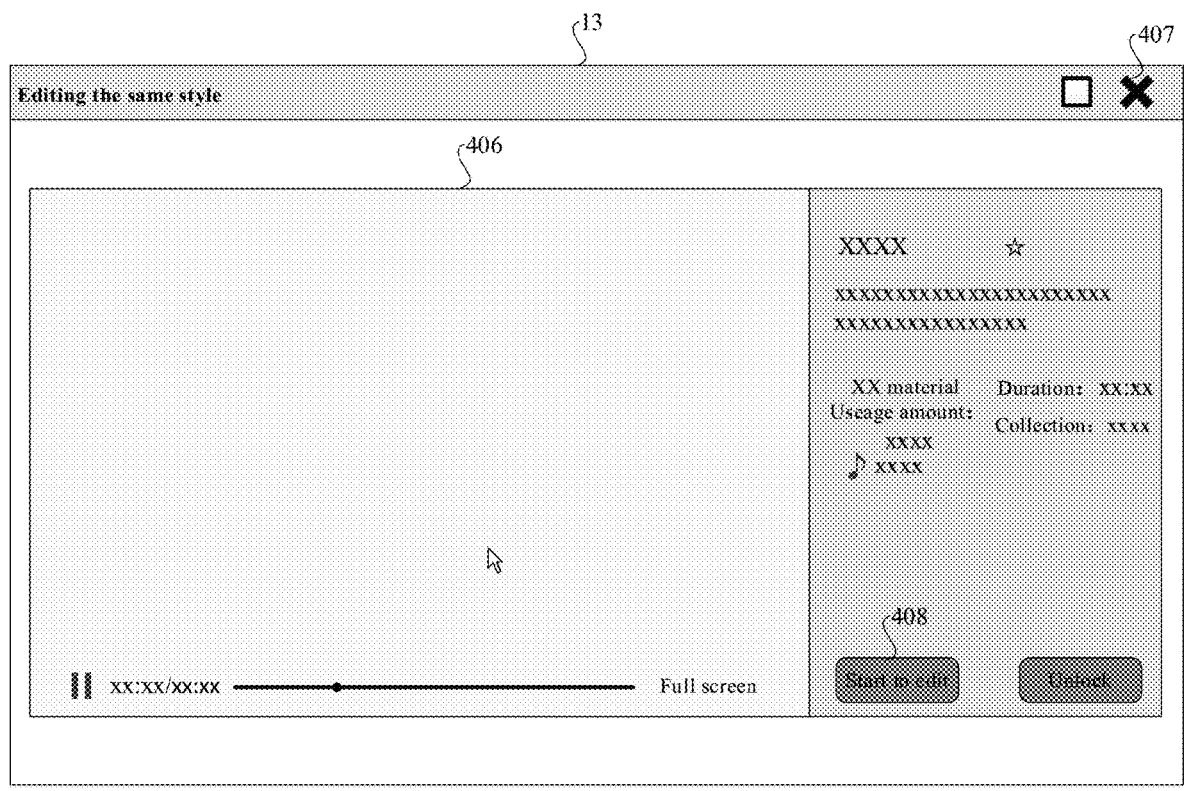

When the user hovers the mouse at the cover of a certain template video, the content of the template video can be played at the corresponding position and can be played in a loop. When the user clicks on the cover of the template video, the application 1 may display a user interface 13 as shown in FIG. 4C on the electronic device, and the user interface 13 is used for playing the template video and supporting streaming preview.

The application 1 may present a progress bar, a play/pause button, and a full screen button when the mouse is hovering in the play area 406, but may not present the above when the mouse leaves the play area 406.

One or more of the following information may also be presented in the user interface 13: name and head portrait of the creator of the template video, template title, duration, amount of material, usage amount, collection, subtitles, and favorites buttons.

The user interface 13 also comprises a close button 407 which, when clicked, returns to the page shown in FIG. 4B.

The user interface 13 also comprises an entry 408. When receiving a triggering operation for the entry 408, the application 1 obtains information about the video editing template, and enters a template editing page; and if the downloading of the video editing template fails, the application 1 can present prompt information "loading the template fails, please try again" to the user.

Figure 4D:
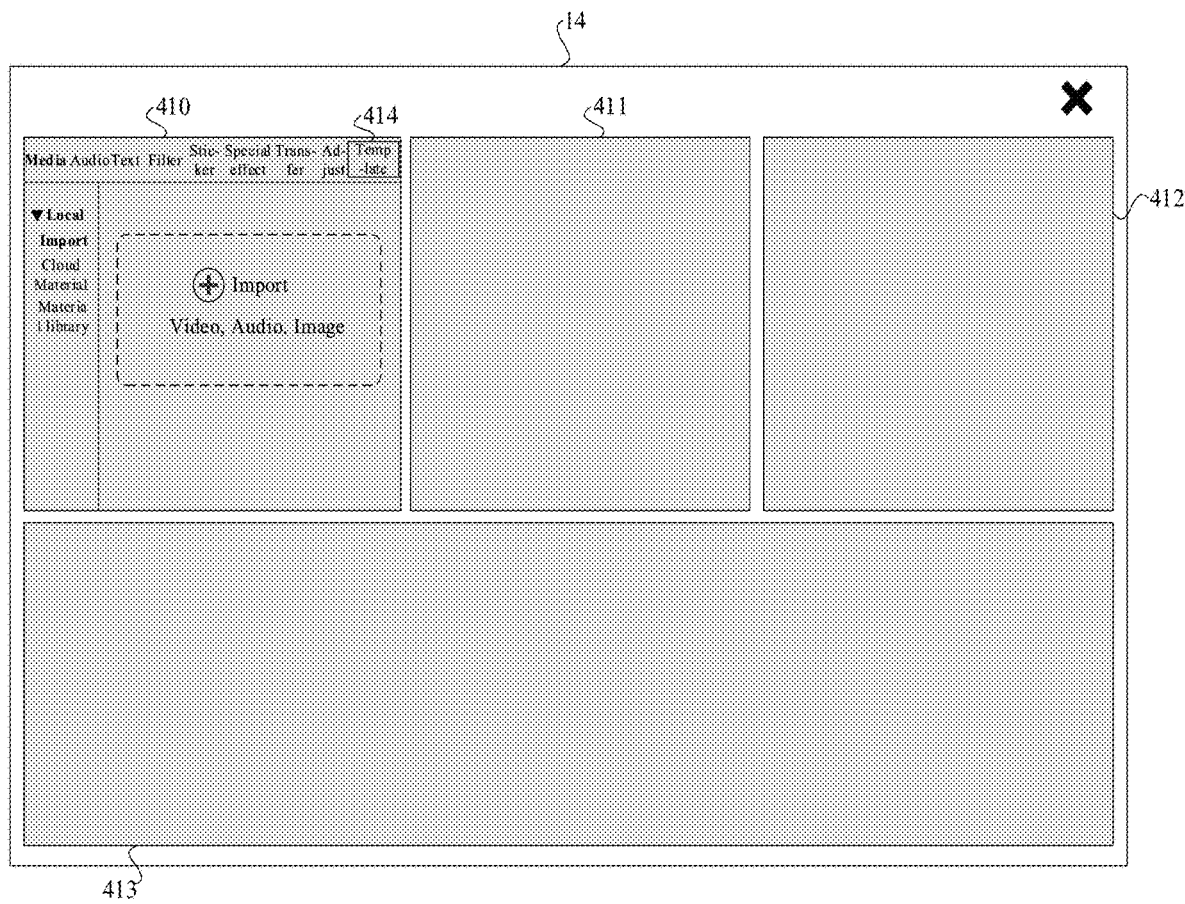
Figure 4E:
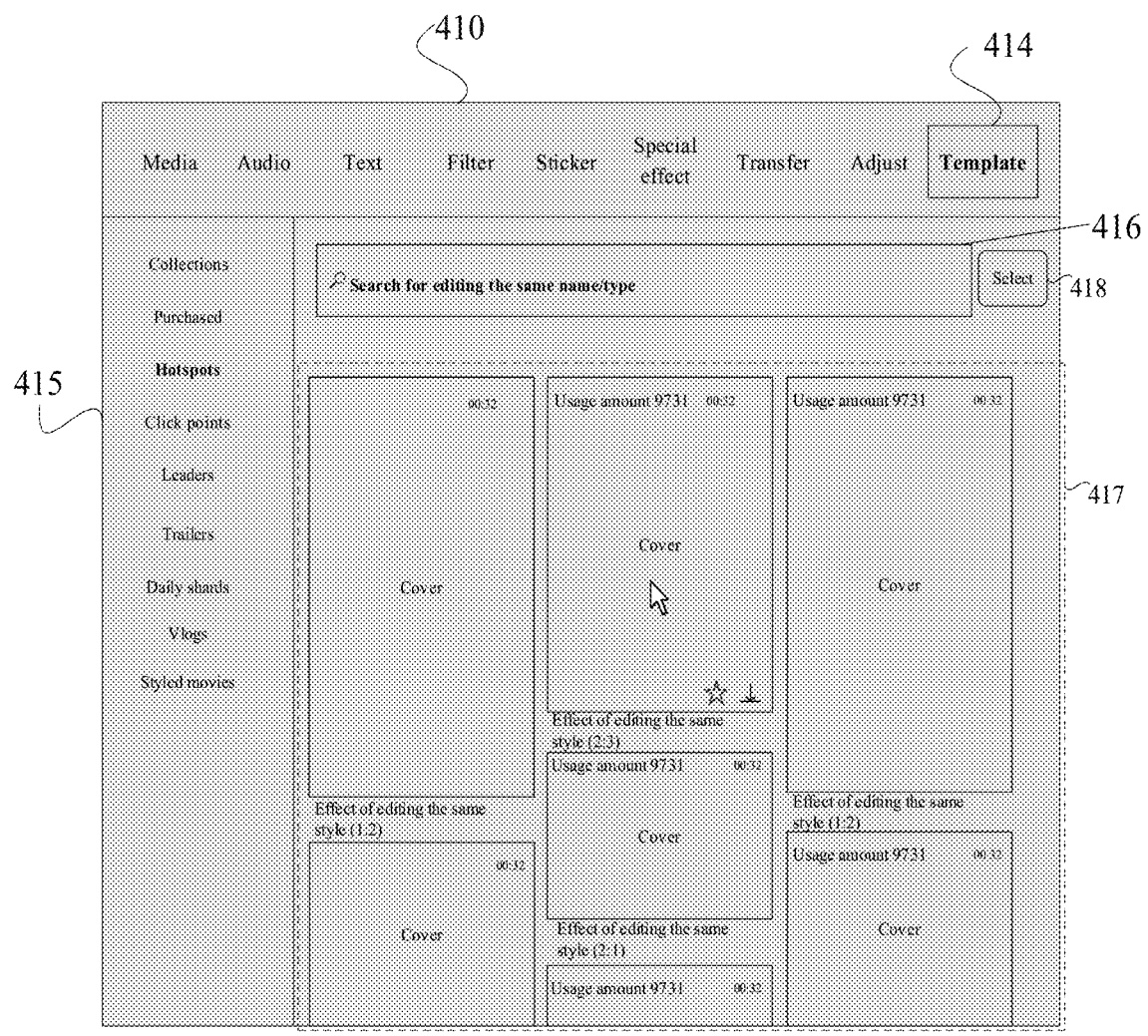

FIGS. 4A to 4C described above show an implementation of using a video editing template triggered by a launcher, and next, FIGS. 4D to 4E show an implementation of using a video editing template triggered by the launcher.

The user interface 11 shown in FIG. 4A comprises a control 409 for entering an editing page, by means of a mouse click of the control 409 by the user, the electronic device may present a user interface 14 as shown in FIG. 4D, the user interface 14 for presenting the editing page.

Referring to FIG. 4D, the user interface 14 comprises: an area 410, an area 411, an area 412, and an area 413. The area 410 is used for presenting a material panel, wherein the material panel mainly provides functions related to media, audio, text, stickers, special effects, transitions, mirrors and templates, the material panel may comprise labels corresponding to the above-mentioned various functions, and the related functions are used by clicking on the related labels, comprising a label 414 corresponding to templates.

The area 411 is a preview play area for a user to preview the editing effect, and the area 411 may comprise a playing time line and display a playing progress, a playing/pausing button, a full screen button, a zoom-in/zoom-out playing picture button and a picture scale setting button. The area 412 is used to present a parameter panel, which may present different relevant parameters in different situations, for example, draft name, save location, resolution, draft frame rate, import mode, etc. may be set through the parameter panel in some situations. It should be noted that when the user does not import the video material to the timeline, the parameter panel may present relevant parameters of the editing draft and provide a modification function, and when the user imports the video material to the timeline, the parameter panel may present relevant editing parameters, for example, relevant parameters such as picture, audio, variable speed, animation, editing tracking and adjustment, and may be set. The area 413 is mainly used for presenting an editing operation panel, and can present video editing tracks and related editing tools such as segmentation, revocation, recovery, deletion, rewinding, mirroring, rotation, editing, recording, closing main editing track magnetic attraction, closing automatic absorption, closing linkage, opening preview axis and zooming timeline. The relevant control layouts are not shown for the areas 411 to 413 in FIG. 4D, and in practical applications, the panel layouts in the areas 411 to 413 can be set according to requirements and can be implemented in any way, and the present disclosure is not limited thereto.

When the user clicks on the control 414 via the mouse, the application 1 updates the interface, and the material panel in the updated user interface is as shown in FIG. 4E, and the player, the parameter panel and the editing operation panel can then continue to present the contents shown in the embodiment shown in FIG. 4D.

Referring to FIG. 4E, the area 410 comprises an area 415 in which template classification labels are presented, comprising, for example: collection/favorites, unlocked, recommended, click points, leaders, trailers, daily shards, styled movies, vlog labels. The area 415 may also comprise a material package label through which a user can import target video material in a variety of ways. A search box 416, an area 417 and a selecting entry 418 can be presented in the area 410, wherein the area 417 is used for aggregating and presenting template videos, and the area 417 may include cover of each template video; and when a user selects a certain template video and clicks the template video via a mouse, the content of the template video is played in the area 411. When the user moves the mouse to the position of the template video, a collection and an addition button corresponding to the template video can be presented, the user can click the collection button via the mouse to add the template video to the favorite list, and can click the addition button via the mouse to trigger the use of the video editing template corresponding to the template video. Alternatively, the video editing template corresponding to the template video may be triggered by dragging to be used. Wherein, when the mouse is suspended in the cover area of the template video, the application 1 does not automatically download the resource package (i.e., not automatically download the video editing template). When the video editing template which is not downloaded or is not downloaded depending on resources is dragged to the time line, prompt contents in a downloaded state are presented, such as "editing the same type is downloaded", and prompt contents in a failed download state can be presented, such as "download failed, click to retry FIGS. 4D through 4E illustrate implementations of using a video editing template triggered by an entry in an editing page.

Triggering the use of the video editing template in any of the above ways will proceed to the following process. Illustratively, the application 1 presents a user interface 16 as shown in FIG. 4F on the electronic device.

Figure 4F:
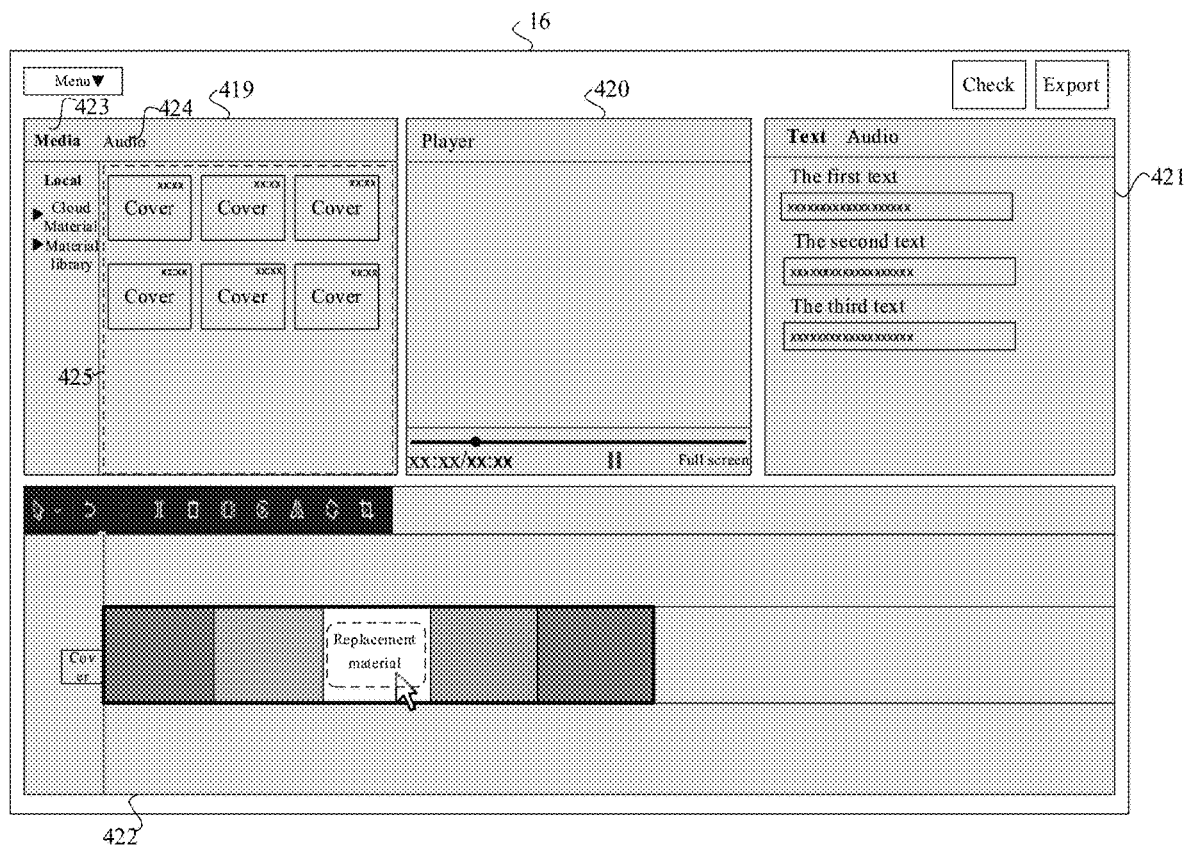

Referring to FIG. 4F, the user interface 16 comprises: an area 419, an area 420, an area 421, and an area 422. The area 419 is used for presenting a material panel, and at this time, the material panel can present a media module and an audio module; wherein the media module can import the video material, wherein the video material can also be imported via a local import, and can also be imported via a cloud material, and can also be imported via a material library provided by the application 1; the audio module can import audio material, can import locally, or can be based on the collected audio material. The area 419 may comprise a label 423 for a media module and a label 424 for an audio module.

Upon entering the user interface 16, the material panel may be positioned by default under the local category label of the media module. The area 419 contains an area 425 that can show the material identification under each category label, e.g., the cover of the media material, the name of the media material, the duration, and the state of the addition, etc. Area 425 may also comprise display modes (e.g.,), sorting, and associated controls (not shown) configured to display certain categories of media material.

The area 420 is a preview play window for the user to preview editing effects. Time information, play progress bars, play/pause buttons, and full screen buttons may be presented in the area 420.

The area 421 is used for presenting a parameter panel, and at this time, the parameter panel is used for presenting the text content corresponding to the text editing operation indicated by the video editing template and the audio adopted by the video editing template, wherein the text label and an audio label may be comprised for switching to present each piece of text content and audio material used by the video editing template.

The area 422 is used for showing a video editing track on which a first composite segment is added, and preset video material added on each specified video segment for forming the first composite segment can be generated according to a cover map of a template video. The area 422 may also present controls, for example, undo, advance, replace, delete, crop duration, crop, mirror, rotate, etc.

Figure 4G:
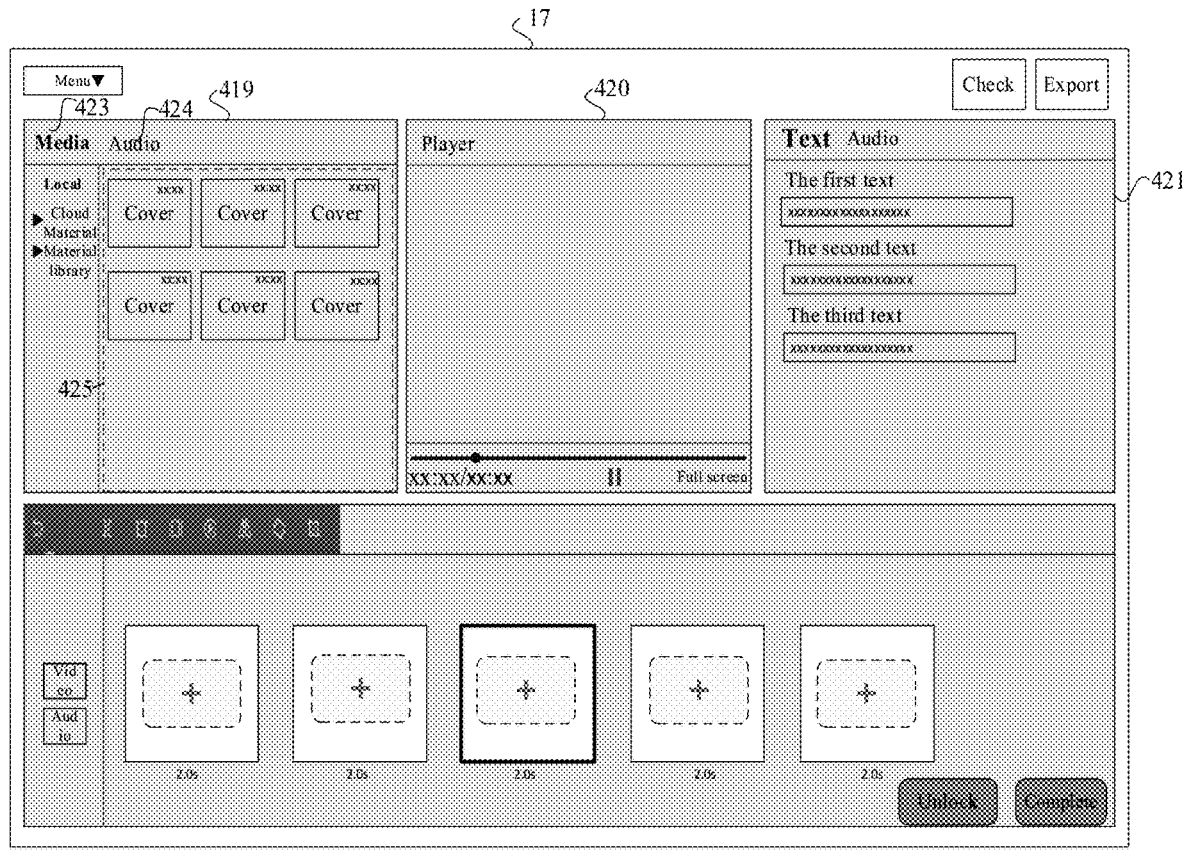

The position interval covered by the first composite segment on the time line of the video editing track may comprise a position interval corresponding to each video material; when the user positions a mouse to the first composite segment, prompt information may be presented based on the current position hovered by the mouse, prompting the user to replace the preset video material on the corresponding video segment; and when the user performs a click operation via the mouse, the application 1 may present the user interface 17 as shown in FIG. 4G on the electronic device.

With reference to the user interface 17 shown in FIG. 4G, a segment identifier corresponding to each specified video segment forming a composite segment is presented in the area 422; the segment identifier not replacing the preset video material/the segment identifier not importing the target video material can be presented in a default mode; and the segment identifier replacing the preset video material/the segment identifier importing the target video material can be a thumbnail image of the target video material. It should be noted that, on the basis of the user interface 17, in the case where the target video material is not imported, if the play button in the area 420 is clicked, a preset video material can be generated from the front cover of the template video, and a preview picture for applying a specified editing operation on the preset video material can be played.

It can be determined that the user triggers to replace the video material of which video segment according to the triggering operation of the user on the video editing track, and when presenting the present 4G, the editing identifier corresponding to the video editing can be located. In the user interface 17, the user can switch the selected segment identifier by the mouse. The preset video material on the specified video segment corresponding to the replacement segment identifier can be realized by any one of the following ways, but is not limited to: dragging a file from a local folder/media library to a segment identifier for replacement, and if the duration of the dragged file (material) is too short to meet the requirements of the video segment, presenting prompt information "the material is too short and cannot be replaced", wherein the dragging of the local file needs to be located in a corresponding area where the mouse is loose, and when being located in the corresponding area, the mouse changes to an added state; dragging files from the local folder requires keeping the local folder on application 1. The local file folder filter can also be called by clicking the segment identifier via the mouse to select the file for replacement; if the duration of the material is too short to meet the requirements of the video segment, prompt information "the material is too short to be replaced" is presented. In addition, after the file is selected, clicking a replacement tool in a toolbar can also realize the replacement of the video material. It is also possible to click the add button corresponding to the material from the material panel and add to the specified video segment corresponding to the first unsubstituted segment identifier by default. If the un-downloaded material is selected from the material panel to be added to the material panel, a loading animation is presented, and if the downloading fails, a retry button is presented. When the video material is a cloud material, downloading is performed automatically when the mouse is hovered on the cloud material, and the cloud material is supported to be dragged to the segment identifier in a non-downloaded state, and loading prompt information such as "material downloading" is presented at a position corresponding to the segment identifier, and if the downloading fails, prompt information "downloading fails, and clicking to retry" is presented.

Since the imported video material may not coincide with the duration of a specified video segment, a segment of the corresponding duration may be selected as the target video material on the specified video segment by default from the leader of the video material after replacement.

Figure 4H:
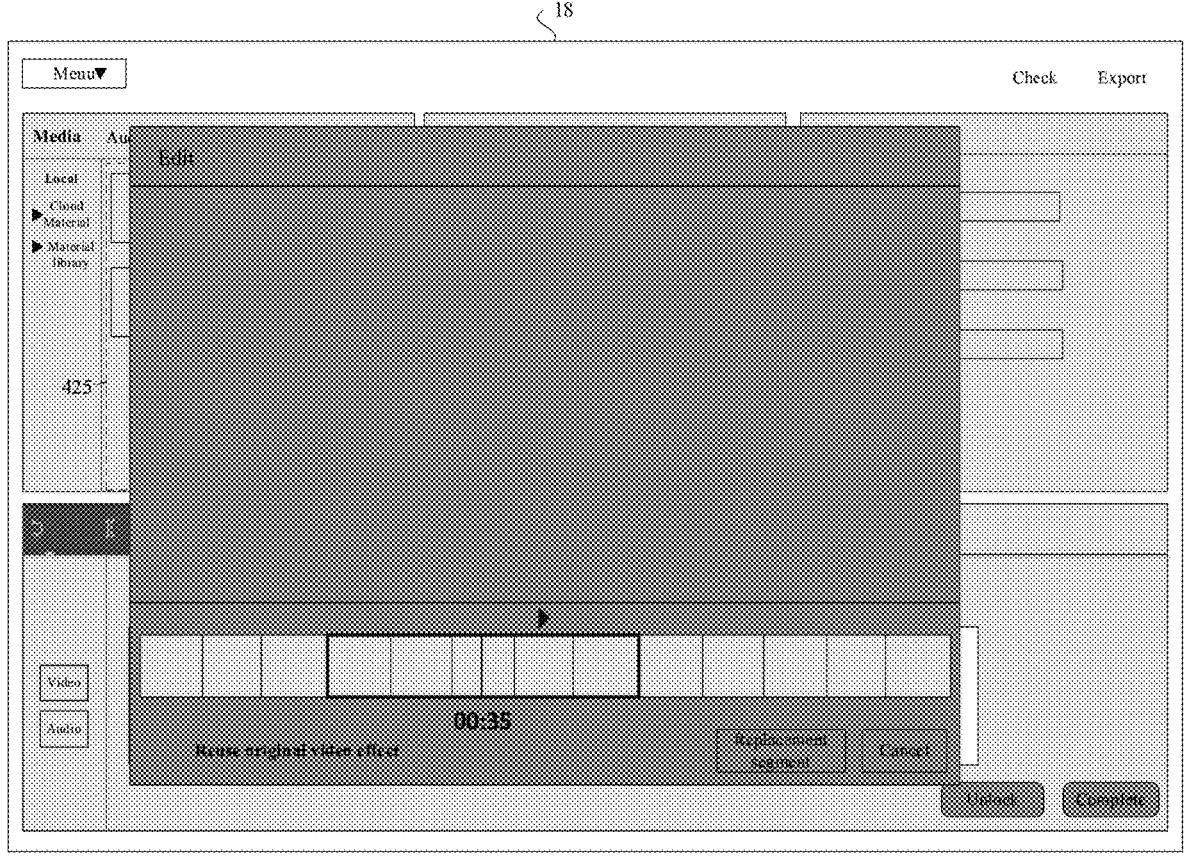
Figure 4I:
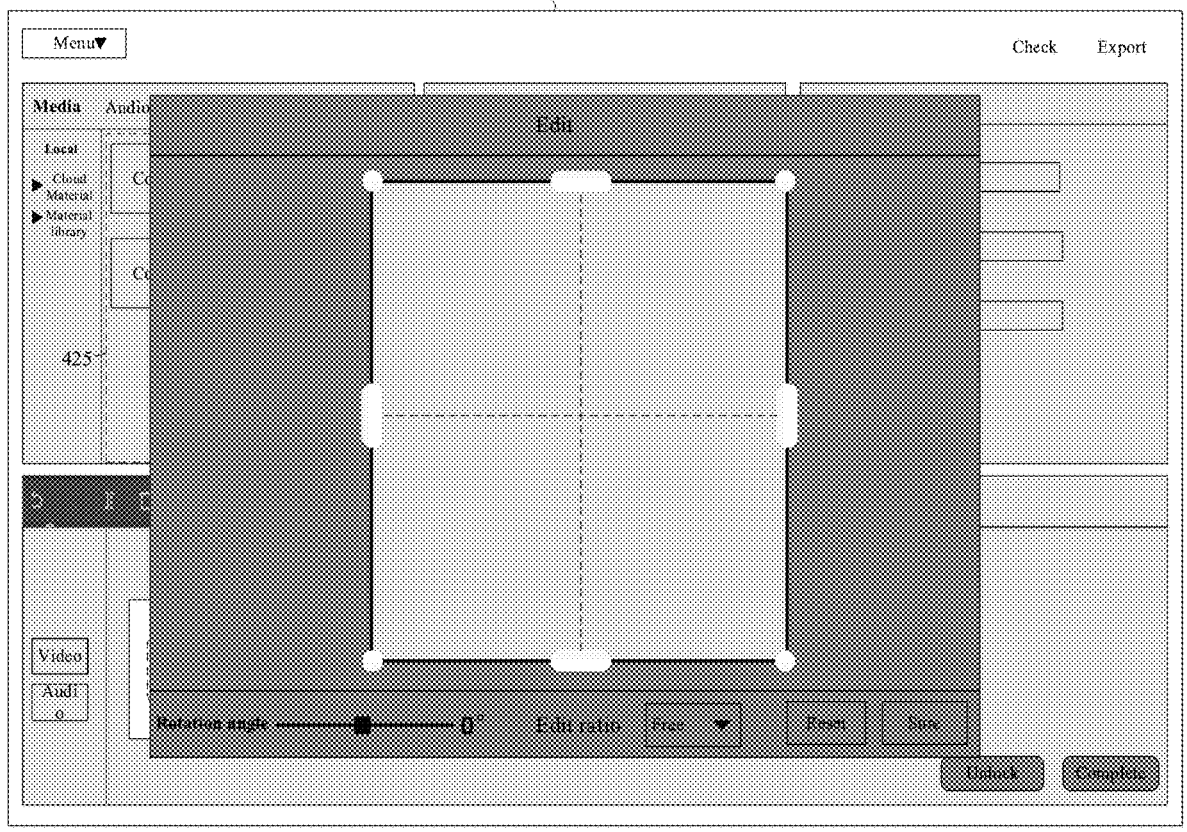

When the user clicks and selects to locate a certain segment identifier, the application 1 may also be triggered to present a menu via a right mouse button, wherein the menu may comprise a local replacement option, an option for adjusting the segment duration, an option for cutting video material, and an option for deleting; and the user may adjust the target video material on a specified video segment corresponding to the segment identifier via the above-mentioned menu. When the segment duration is adjusted, a user interface 18 as shown in FIG. 4H can be presented in the user interface, wherein the user interface 18 comprises an editing window, a preview screen of the video material is presented above the editing window, and a time line is presented below the editing window, and the time range covered by the intercepted target video material can be identified by an interception box, the intercepted target video material can be adjusted by dragging the position of the interception box, and the segment duration adjustment can be completed by clicking a confirmation button in the window. When editing the video material, the window as shown in FIG. 4I can be presented, and an editing area is presented at the top; a user can crop a picture of the video material by adjusting the size of an editing frame in the editing area. In addition, a control for adjusting a rotation angle, a control for selecting an editing scale and a reset button can be presented at a position close to the bottom of the window.

After replacing a pre-set video material on one or more video segments, the user can start playing at the beginning of a composite segment by clicking a play button in the area 420, and a corresponding editing identifier is automatically highlighted when the video material corresponding to a specified video segment is played; if there are specified video segments with time overlapping, the segment identifier corresponding to the specified video segment with a higher level is selected to highlight by default.

In addition, when a segment identifier is selected, the parameter panel may present a volume adjustment button that supports adjusting the volume of audio on the specified video segment.

A confirmation button may be included in the area 422, and the user operates the button via a mouse, and then a target composite segment is formed based on the target video material imported from the user to each specified video segment and a specified editing operation applied to the specified video segment, and is added to the video editing track, which is equivalent to forming the target composite segment and importing the target composite segment into the current editing draft. If the application 1 detects that there is a pre-set video material that is not replaced, after the user clicks the confirmation button via the mouse, the application 1 may present a pop-up prompt "still have material that is not replaced, and whether to continue", and provide a cancel button and a confirmation button; when the user clicks the confirmation button via the mouse, a normal draft is entered; and if the cancel button is clicked, the template editing page is returned.

On the basis of the embodiment shown in FIG. 4G, the user can select a text label in the area 421 to trigger the present of each piece of text content used by the video editing template in the area 421, wherein each piece of text content corresponds to a text box, and when the user clicks the text box via the mouse, the text content in the text box can be modified. Alternatively, the area 420 can be operated and the text content can also be modified by double clicking on the text content previewed in area 420, and the area 421 automatically locates the corresponding text and updates the corresponding text.

Based on the embodiment shown in FIG. 4G, the user can trigger the present of an identification of the audio material used by the video editing template in the area 421 by selecting an audio tag in the area 421, and then delete and import the desired new audio material for replacement by a corresponding control.

In addition, if the video editing template is entered from the feed stream, but the first edit is not completed, the feed stream interface is presented by default after the panel is closed; if the video editing template is entered from the feed stream and the first editing is completed, then closing the panel and returning to the launcher interface; if a video editing template is added from the material panel, the launcher interface is returned after the panel is closed.

In some cases, the user can also unlock the draft, and the unlocking report can be understood as unlocking and presenting all the video editing tracks, which is equivalent to releasing the relative relationship between all the video material forming the composite segment and the specified editing operation on the time line. When the user triggers the unlocking, prompt information "unlocking the draft will expand the composite segment" can be presented. After the user confirms the unlocking and completes the unlocking flow, the application 1 can expand the composite segment and present the video editing tracks respectively corresponding to each video material and the specified editing operation, and the user can adjust the video material and the specified editing operation individually, equivalent to a user adjusting a video editing template so as to satisfy a user's editing requirements.

In conjunction with the embodiments shown in FIGS. 4A to 4I, the present disclosure combines a video editing template with a composite segment function, when the user imports target video material into a specified video editing indicated by the video editing template and forms the composite segment to be added on a corresponding video editing track, the user can edit the composite segment as a whole, and using the composite segment can simplify the complex editing item, thereby improving the processing efficiency of the user using the video editing template to perform video editing. In addition, the number of video material and video editing operations forming a composite segment is usually multiple, and the number of video editing tracks corresponding to the composite segment is far less than the total number of video editing tracks respectively corresponding to the video material and video editing operations for forming the composite segment. It can be seen therefrom that using the composite segment can also simplify the template editing page present elements and improve the visual effect. In addition, the user's ability to unlock the draft is also preserved, which facilitates the user to adjust the video editing template, meets the user's editing requirements and improves the editing experience.

Figure 5:
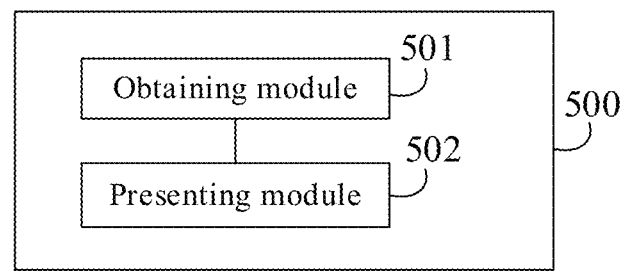
FIG. 5 illustrates a structural diagram of an apparatus for video editing in accordance with an embodiment of the present disclosure.

FIG. 5 illustrates a block diagram of an apparatus for video editing in accordance to an embodiment of the present disclosure. Referring to FIG. 5, the apparatus for video editing 500 according to the present embodiment comprises:

An obtaining module 501 for obtaining the video editing template, the video editing template being used for indicating to add the specified editing operation to one or more specified video segments; wherein a composite segment corresponding to a set of editing tracks can be obtained via the combination of editing track segments of the one or more specified video segments and editing track segments of the added specified editing operation.

A processing module 502 for, in response to the triggering operation for importing video material, importing corresponding target video material into one or more specified video segments indicated by the video editing template; and, in response to the triggering operation to form the composite segment, combining the target video material imported on the one or more specified video segments with the specified editing operation indicated by the video editing template to form the target composite segment, and adding the target composite segment on the first video editing track.

In some embodiments, the processing module 502 is specifically used for controlling the apparatus for video editing 500 to present segment identifiers corresponding to the one or more video segments on a one-to-one basis; the processing module 502 is further configured to identify, in response to a triggering operation on the segment identifier, the target video material to be added to the specified video segment corresponding to the segment identifier.

In some embodiments, the processing module 502 is specifically used for obtaining a composite segment corresponding to the video editing template and adding the composite segment on the first video editing track; in response to the triggering operation for the composite segment, the apparatus for video editing 500 is controlled to present the editing identifications of the one or more specified video segments on a one-to-one basis.

In some embodiments, the processing module 502 is further configured to crop the target video material imported on the specified video segment, empty the target video material imported on the specified video segment, or replace the target video material imported on the specified video segment.

In some embodiments, the processing module 502 is further configured to, in response to a triggering operation for unlocking the target composite segment combination, present each specified video segment for forming the target composite segment and a video editing track respectively corresponding to a specified editing operation.

In some embodiments, the processing module 502 is further configured to edit the text content corresponding to the text editing operation indicated by the video editing template.

In some embodiments, the processing module 502 is also used to replace the audio material used by the video editing template.

In some embodiments, the processing module 502 is further configured to, in response to a triggering operation for compositing the target composite segment, perform video compositing on the target video material on each editing track segment contained in the target composite segment and an added specified editing operation to obtain composited video.

The apparatus for video editing provided in the present embodiment can be used for implementing any one of the foregoing method embodiment technical solutions, and the implementation principles and technical effects thereof are similar, and reference can be made to the detailed description of the foregoing method embodiments for the sake of brevity, and this is not repeated herein.

Figure 6:
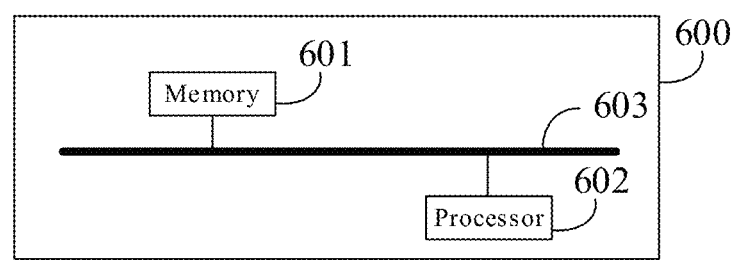
FIG. 6 illustrates a structural diagram of an electronic device in accordance to an embodiment of the present disclosure.

FIG. 6 illustrates a block diagram of an electronic device in accordance to an embodiment of the present disclosure. Referring to FIG. 6, the electronic device 600 according to the present embodiment comprises: a memory 601 and a processor 602.

The memory 601 may be a separate physical unit that may be coupled to the processor 602 via a bus 603. The memory 601 and the processor 602 may also be integrated together, implemented in hardware, etc.

The memory 601 is used to store program instructions that the processor 602 calls to perform the operations of any of the above method embodiments.

Alternatively, where some or all of the methods of the embodiments described above are implemented in software, the electronic device 600 may comprise only the processor 602. The memory 601 for storing a program is located outside the electronic device 600, and the processor 602 is connected to the memory through a circuit/wire for reading and executing the program stored in the memory.

The processor 602 may be a central processing unit (CPU), a network processor (NP), or a combination of a CPU and an NP.

The processor 602 may further comprise a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 601 may comprise a volatile memory, such as a random-access memory (RAM); the memory may also comprise a non-volatile memory, such as a flash memory, a hard disk drive (HDD) or a solid-state drive (SSD); the memory may also comprise a combination of memories of the kind described above.

The disclosed embodiments also provide a readable storage medium comprising: computer program instructions; the computer program instructions, when executed by at least one processor of the electronic device, implement the method for video editing of any of the method embodiments described above.

Embodiments of the present disclosure also provide a computer program product comprising computer program instructions stored in a readable storage medium from which at least one processor of the electronic device can read the computer program instructions, execution of the computer program instructions by the at least one processor causing the electronic device to implement the method for video editing as shown in any of the method embodiments above.

It is noted that relational terms such as "first", "second", and the like may be used solely to distinguish one entity or operation from another entity or operation without necessarily requiring or implying any actual such relationship or order between such entities or operations herein. Furthermore, the terms "comprises", "comprising", or any other variation thereof, are intended to cover a non-exclusive inclusion, such that a process, method, article, or apparatus that comprises a list of elements does not comprise only those elements but may comprise other elements not expressly listed or inherent to such process, method, article, or apparatus. An element proceeded by "comprises a . . . " does not, without more constraints, preclude the existence of additional identical elements in the process, method, article, or apparatus that comprises the element.

The previous description of the disclosed embodiments is provided to enable any person skilled in the art to make or use the present disclosure. Various modifications to these embodiments will be readily apparent to those skilled in the art, and the generic principles defined herein may be implemented in other embodiments without departing from the spirit or scope of the disclosure. Thus, the present disclosure is not intended to be limited to the embodiments shown herein but is to be accorded the widest scope consistent with the principles and novel features disclosed herein.

We claim:

1. A method for video editing comprising:
obtaining a video editing template, the video editing template comprising information specifying a plurality of video segments, information specifying editing operations, and information indicating to add at least one specified editing operation to one or more specified video segments, wherein the specified editing operations comprise special effect operations, filter operations, text operations, or music editing operations;
displaying a plurality of segment identifiers corresponding to the plurality of video segments specified by the video editing template in response to receiving information indicative of applying the video editing template;
importing one or more target video materials into the one or more specified video segments by manipulating one or more corresponding segment identifiers among the plurality of segment identifiers; and
generating a target composite segment by combining the imported one or more target video materials with the at least one specified editing operation indicated by the video editing template; and
adding the target composite segment on a first video editing track.

2. The method according to claim 1, further comprising:
displaying the plurality of segment identifiers corresponding to the plurality of video segments on a one-to-one basis, wherein the displaying the plurality of segment identifiers corresponding to the plurality of video segments on a one-to-one basis further comprises:
obtaining a composite segment corresponding to the video editing template, and adding the composite segment on the first video editing track; and in response to a triggering operation for the composite segment, displaying the plurality of segment identifiers corresponding to the plurality of video segments on the one-to-one basis.

3. The method of claim 1, further comprising:
editing the imported one or more target video materials, emptying the imported one or more target video materials, or replacing target imported one or more target video materials.

4. The method of claim 1, further comprising:
in response to a triggering operation unlocking the target composite segment combination, displaying each specified video segment for forming the target composite segment and a video editing track respectively corresponding to a specified editing operation.

5. The method of claim 1, further comprising:
editing a text content corresponding to a text editing operation indicated by the video editing template.

6. The method of claim 1, further comprising:
replacing audio material used by the video editing template.

7. The method of claim 1, further comprising:
in response to a triggering operation for compositing the target composite segment, performing video compositing on a target video material on each editing track segment contained in the target composite segment and an added specified editing operation to obtain a composite video.

8. An electronic device comprising: a memory and a processor;
the memory is configured to store computer program instructions;
the processor is configured to execute the computer program instruction to cause the electronic device to perform editing operations, the operations comprising:
obtaining a video editing template, the video editing template comprising information specifying a plurality of video segments, information specifying editing operations, and information indicating to add at least one specified editing operation to one or more specified video segments, wherein the specified editing operations comprise special effect operations, filter operations, text operations, or music editing operations;
displaying a plurality of segment identifiers corresponding to the plurality of video segments specified by the video editing template in response to receiving information indicative of applying the video editing template;
importing video material, importing one or more target video materials into the one or more specified video segments by manipulating one or more corresponding segment identifiers among the plurality of segment identifiers; and
generating a target composite segment by combining the imported one or more target video materials with the at least one specified editing operation indicated by the video editing template; and
adding the target composite segment on a first video editing track.

9. The electronic device according to claim 8, the operations further comprising:
displaying the plurality of segment identifiers corresponding to the plurality of video segments on a one-to-one basis, wherein the displaying the plurality of segment identifiers corresponding to the plurality of video segments on a one-to-one basis further comprises:

obtaining a composite segment corresponding to the video editing template, and adding the composite segment on the first video editing track; and in response to a triggering operation for the composite segment, displaying the plurality of segment identifiers corresponding to the plurality of video segments on the one-to-one basis.

10. The electronic device of claim 8, wherein the operations further comprise:

editing the imported one or more target video materials, emptying the imported one or more target video materials, or replacing target imported one or more target video materials.

11. The electronic device of claim 8, wherein the operations further comprise:

in response to a triggering operation unlocking the target composite segment combination, displaying each specified video segment for forming the target composite segment and a video editing track respectively corresponding to a specified editing operation.

12. The electronic device of claim 8, wherein the operations further comprise:

editing a text content corresponding to a text editing operation indicated by the video editing template.

13. The electronic device of claim 8, wherein the operations further comprise:

replacing audio material used by the video editing template.

14. The electronic device of claim 8, wherein the operations further comprise:

in response to a triggering operation for compositing the target composite segment, performing video compositing on a target video material on each editing track segment contained in the target composite segment and an added specified editing operation to obtain a composite video.

15. A non-transitory readable storage medium comprising: computer program instructions;

at least one processor of an electronic device executing the computer program instructions to cause the electronic device to perform editing operations, the operations comprising:

obtaining a video editing template, the video editing template comprising information specifying a plurality of video segments, information specifying editing operations, and information indicating to add at least one specified editing operation to one or more specified video segments, wherein the specified editing operations comprise special effect operations, filter operations, text operations, or music editing operations;

displaying a plurality of segment identifiers corresponding to the plurality of video segments specified by the video editing template in response to receiving information indicative of applying the video editing template;

importing one or more target video materials into the one or more specified video segments by manipulating one or more corresponding segment identifiers among the plurality of segment identifiers; and generating a target composite segment by combining the imported one or more target video materials with the at least one specified editing operation indicated by the video editing template; and adding the target composite segment on a first video editing track.

16. The non-transitory readable storage medium according to claim 15, the operations further comprising:

displaying the plurality of segment identifiers corresponding to the plurality of video segments on a one-to-one basis, wherein the displaying the plurality of segment identifiers corresponding to the plurality of video segments on a one-to-one basis further comprises:

obtaining a composite segment corresponding to the video editing template, and adding the composite segment on the first video editing track; and in response to a triggering operation for the composite segment, displaying the plurality of segment identifiers corresponding to the plurality of video segments on the one-to-one basis.

17. The non-transitory readable storage medium of claim 15, the operations further comprising:

editing the imported one or more target video materials, emptying the imported one or more target video materials, or replacing target imported one or more target video materials.

* * * * *